Nov. 30, 1943. L. SEITZ 2,335,456
AIR FILTER
Filed June 16, 1941

Inventor
Ludwig Seitz
By Maréchal & Noë
Attorneys

Patented Nov. 30, 1943

2,335,456

UNITED STATES PATENT OFFICE 2,335,456

AIR FILTER

Ludwig Seitz, Augsburg, Germany; vested in the Alien Property Custodian

Application June 16, 1941, Serial No. 398,268
In Germany July 5, 1940

5 Claims. (Cl. 183—10)

This invention relates to an air filter forming a vortex, and particularly to a filter of this type intended for use in internal combustion engines.

The known kinds of filters of this class possess a drumlike or similarly shaped casing at the bottom of which the drawn in air enters in tangential direction, passes along the walls thereof and comes out again at the cover in the center. Owing to the formation of an air vortex inside the filter the oil is entrained and rises on the walls due to centrifugal force with the result that a large contact surface between air and oil is produced whereby the air is deprived of dust which combines with the oil. At its emergence the air is separated from the oil by means of fine screens, filter masses, etc.

These known air filters are, however, open to the objection that their efficiency is determined by the size of the drum surface, so that larger engines require several filters for handling the amounts of air needed. While such an arrangement may be tolerable in case of some stationary engines, it cannot be used in numerous other instances, and particularly not in drives for vehicles, because room is lacking for accommodating air filters of the requisite size.

The drawbacks mentioned are overcome according to the invention by constructing the vortex casing of the filter in the form of a multiple spiral, i. e., by fitting into each other several spiral casings and thereby arranging a plurality of air filters within a very small space in a common casing, the amount of space saved being so large that the air filter, even for maximum requirements, can be easily placed anywhere.

The provision of a multiple spiral in the vortex casing affords, however, still another advantage. By fitting the side walls of the various spiral channels formed with slots extending transversely to the direction of air flow a portion of the filter oil rising on these walls due to centrifugal force will be caused to pass into and transversely through the adjacent external channel to the outer side wall thereof. The oil thus forms a dense mist through which the air in the adjacent outer channel is conducted and thereby still more intensely purified. Furthermore, the slots prevent the accumulation of too much oil in the center of the casing, since part of the oil always flows off through the slots into a remoter outward portion of one of the other spiral channels.

Figure 1:
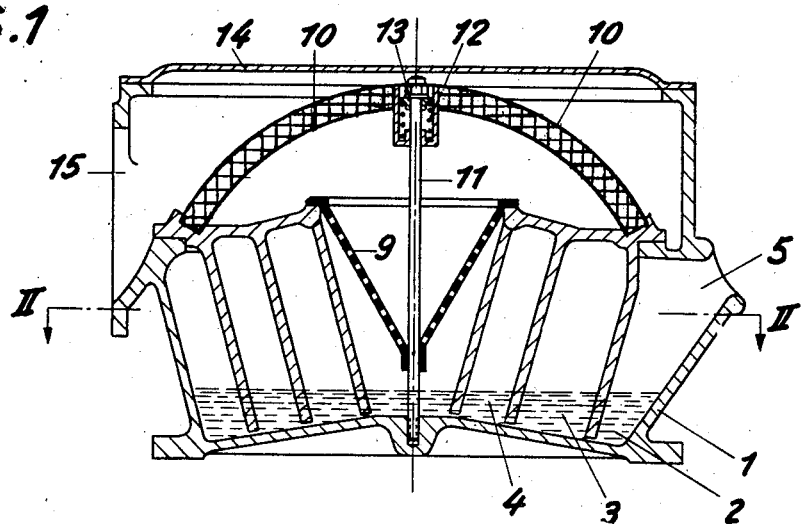
Figure 2:
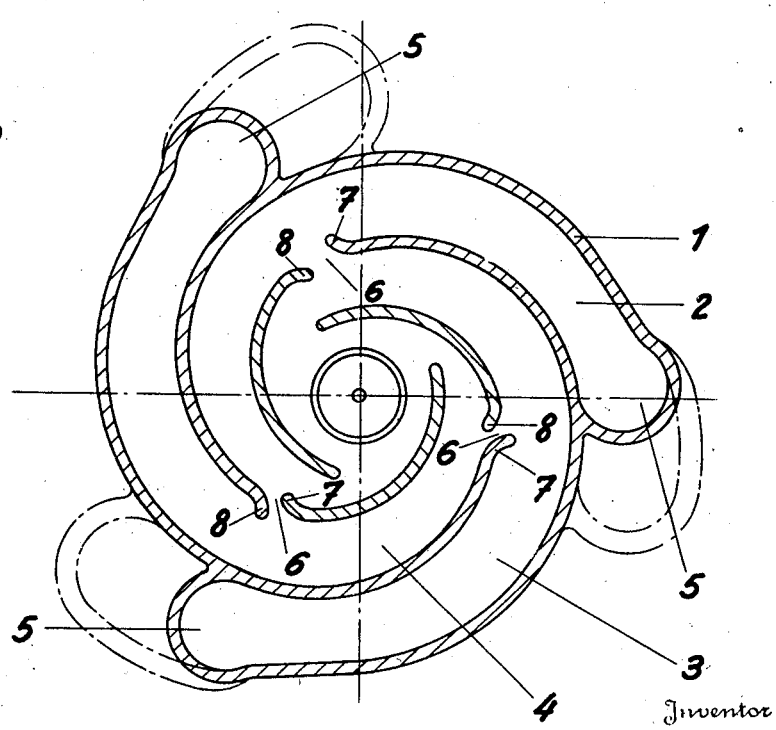

One form of the invention is illustrated by way of example in the accompanying drawing, in which Figure 1 is an axial section through an air filter according to the invention; and Fig. 2, a cross section on the line II—II, of Fig. 1.

The filter casing 1 possesses three spirally extending channels 2, 3 and 4 arranged one within the other. The drawn in air enters at the open inlets 5 of the outer circumference of the casing 1 and, due to suction draft, flows to the center thereof. The oil contained in the casing 1 is entrained and, owing to centrifugal force and the inclined walls of the channels 2, 3 and 4, rises on these walls, so that a large contact surface between oil and air is produced. Fig. 1 indicates the oil level when the filter is not in use. The amount of filter oil to be supplied may be varied to suit requirements.

The side walls of the channels 2, 3 and 4 possess slots 6 through which the entrained oil moving up on the outer walls of the channels passes into the adjacent outer channel and crosses it while travelling to the external wall thereof. Through the oil mist formed in this manner all the air contained in the channel concerned must pass and is thus filtered in an extraordinarily effective way. The edges 7, 8 of the slots 6 are preferably bent so as to facilitate the passage of the oil from one channel into another.

The air collects in the center of the filter casing 1 and thence flows off in upward direction. On its way to the outlet the air first moves through a screen 9 and then through the fine filters 10, whereby the oil contained therein is separated. The screen 9 and the fine filters 10 are easily detachably secured to the casing 1 by a rod 11, a spring 12 and a nut 13. A removable cover 14 permits the taking out of the screen 9 and of the filters 10 as well as cleaning of the casing 1. At 15 the purified air enters the conduit leading to the point of consumption, for instance the working cylinders of a Diesel engine.

What is claimed is:

1. A filter for a gaseous fluid comprising a casing having spiral walls forming a plurality of spiral channels with each channel arranged partly within another of such channels, said casing having fluid supply openings communicating with the outer ends of said channels and having a singe fluid discharge opening communicating with the inner ends of all of said channels, a bottom for the casing arranged to retain filtering liquid in the lower portions of said channels when the filter is not in operation, said walls having intermediate their ends openings providing communication between each channel and an adjacent channel through which openings the filtering liquid is thrown by whirling action produced in said channels while the filter is in operation.

2. A filter for gaseous fluid comprising a casing having spiral walls forming a plurality of spiral channels with each channel arranged partly within another of such channels, said casing having a fluid supply opening at the outer end of each of said channels and having a common discharge opening at the inner ends of said channels, a bottom for the casing arranged to retain filtering liquid in the lower portions of said channels when the filter is not in operation, said walls having an upward and outward inclination and having openings arranged above the bottom portions thereof providing communication between each passage and another of such passages through which the filtering liquid is thrown while the filter is in operation.

3. An air filter of the character described, comprising a casing having upwardly and outwardly inclined spiral walls providing a plurality of spiral channels each arranged partly within another of said channels, a bottom arranged to retain filtering liquid in the lower portions of said channels, said walls having intermediate their ends slots placing upper portions of each of said channels in lateral communication with the upper portions of an adjacent channel, said casing having separate air inlet openings for said channels and having a single discharge opening for said channels.

4. An air filter of the character described, comprising a casing having upwardly and outwardly inclined spiral walls forming a plurality of channels each of which is arranged partly within another of said channels, said walls having openings placing upper portions of each channel in communication with another of said channels, a bottom for the casing arranged to retain filtering liquid in the lower portions of said channels when the filter is not in operation, said walls having projections extending out into said channels on the supply side of said openings and facilitating the passage of the filtering liquid from said channels into adjacent channels, said casing having a separate air inlet at an outer portion thereof for each of said channels and having a common discharge outlet.

5. An air filter of the character described, comprising a lower casing portion arranged to hold a quantity of filtering liquid, an upper casing portion fitting thereon and having outwardly and upwardly inclined spiral walls extending towards but spaced at their lower ends from the bottom of the lower casing portion and having openings at upper portions thereof, said walls forming a plurality of spiral channels each of which is arranged partly within another of such channels, said channels having separate inlet openings for air supply thereto at the outer portions of the lower casing, and said upper casing portion having a central discharge opening communicating with all of said channels.

LUDWIG SEITZ.